(12) United States Patent
Coveley

(10) Patent No.: US 6,563,813 B1
(45) Date of Patent: May 13, 2003

(54) WIRELESS TRANSPORT PROTOCOL

(75) Inventor: Michael E. Coveley, Richmond Hill (CA)

(73) Assignee: Solbyung Coveley, Richmond Hill (CA)

( * ) Notice: Subject to any disclaimer, the term of this patent is extended or adjusted under 35 U.S.C. 154(b) by 0 days.

(21) Appl. No.: 09/456,453

(22) Filed: Dec. 8, 1999

Related U.S. Application Data

(60) Provisional application No. 60/111,556, filed on Dec. 9, 1998.

(51) Int. Cl.⁷ .................................................. H04J 3/16
(52) U.S. Cl. ........................ 370/349; 714/746; 455/426
(58) Field of Search ................................. 714/746, 748, 714/750; 370/349, 310; 455/422, 426, 517

(56) References Cited

U.S. PATENT DOCUMENTS 5,392,278 A * 2/1995 Teel et al. .................. 370/58.3

FOREIGN PATENT DOCUMENTS

WO WO 98/42108 9/1998
WO WO 98/47166 10/1998

OTHER PUBLICATIONS

Copy of European Application with Search Report published Jun. 5, 2002.
"I–TCP: Indirect TCP for Mobile Hosts" Ajay Bakre et al., Proceedings of the International Conference on Distributed Computing Systems, Vancouver, May 30–Jun. 2, 1995, pp 136–143.
"Wireless Application Protocol Architecture Specification", WAP Architecture Version, Apr. 30, 1998, pp1–20.

* cited by examiner

Primary Examiner—Nguyen T. Vo
(74) Attorney, Agent, or Firm—Baker & Daniels

(57) ABSTRACT

A wireless transport protocol for data packets transmitted over a wireless communication network includes a user data field having data to be transmitted by a sending party to a receiving party. At least one sequencing field is appended to the data field. The at least one sequencing field includes information identifying the last data packet received by the sending party that was transmitted by the receiving party. This allows a sending party to determine whether the receiving party has received data packets by examining data packets received from the receiving party.

20 Claims, 4 Drawing Sheets

WIRELESS TRANSPORT PROTOCOL

CROSS REFERENCE TO RELATED APPLICATIONS

This application claims the priority benefit of provisional patent application Ser. No. 60/111,556, filed Dec. 9, 1998, under the provisions of 35 U.S.C. §119(e).

FIELD OF THE INVENTION

The present invention relates to communication systems and packet data networks and in particular to a wireless transport layer protocol for wireless packet data networks and a communications system employing the same.

BACKGROUND OF THE INVENTION

During recent years, tremendous growth within the telecommunications industry has been witnessed. Internet and global networks are now a consequential part of everyday life. The data communications segment of the telecommunications industry is developing and increasing at such a rate that it is becoming the dominant type of private and business commerce exchange on most networks. However, basically all data communications has been designated to conventional "wired" land-line networks.

On the other hand, the wireless industry has indeed become established, although wireless networks have only marginally been used for data communications. The success of wireless voice telephone (cellular) services as reflected by the significant traffic volume, makes it clear that wireless data communications are categorically destined to become a dominant, if not the dominant, type of data communications within the telecommunications industry. However, for this to happen, wireless networks must achieve at least a comparable throughput to their "wired" land-line counterparts in terms of capacity and reliability. The physical media for wireless communications is entirely different in all aspects and characteristics than its "wired" land-line counterpart. These differences must be dealt with to allow wireless and "wired" land-line communication domains to effectively, effortlessly and realistically interact.

It is therefore an object of the present invention to provide a novel wireless transport layer protocol for wireless packet data networks and a communications system employing the same.

SUMMARY OF THE INVENTION

According to one aspect of the present invention there is provided a wireless transport protocol for data packets transmitted over a communication network wherein at least one wireless party communicates with a wired party at least partially over a wireless packet data network, said wireless transport protocol comprising;

a user data field including data to be transmitted by a sending party to a receiving party; and at least one sequencing field appended to said data field, said at least one sequencing field including information identifying the last data packet received by the sending party that was transmitted by the receiving party.

Preferably, the information identifies the identification (ID) number of the last data packet received by the sending party transmitting the current packet. In the preferred embodiment, the at least one sequencing field includes transmit and receive sequencing fields. The transmit sequencing field specifies a current packet ID and the receive sequencing field specifies the ID of the last received data packet.

According to another aspect of the present invention there is provided a communication system comprising:

at least one wireless client;

a wireless network;

at least one land-line client; and a network backbone interfacing said at least one land-line client and said wireless network to allow data packets to be exchanged between a wireless client and a land-line client, said communication systems using a wireless transport protocol during exchange of data packets, said data packets including a user data field including data to be transmitted from one client to another client; and at least one sequencing field identifying the last packet received by the client that is transmitting the current packet.

In yet another aspect of the present invention there is provided in a wireless communication network, a method of confirming delivery of data packets during data exchange between parties comprising the steps of:

providing each data packet sent by one party to another party with information identifying the last data packet received by said one party that was transmitted by the other party; and upon receipt of a data packet by one party from another party, examining said information to determine if the information confirms receipt of the last data packet transmitted by the one party to the other party.

Preferably, the method further includes the step of re-transmitting the last data packet sent by one party to another party when a data packet received by the one party from the other party does not include confirmation of receipt of the last packet sent by the one party.

The wireless transport layer protocol in accordance with the present invention operates the OSI transport layer and is suitable for basically any kind of wireless communications. The wireless transport layer protocol helps to reduce wireless traffic and therefore, significantly increases the actual wireless network throughput, regardless of the backbone connections, the backbone protocol, and/or overall network characteristics. The wireless transport layer protocol also allows basically any kind of remote backbone transport protocol layer, albeit connectionless or connectable oriented, to be controlled.

The present invention also provides advantages in that communication transport and bandwidth in wireless packet data networks is increased thereby enhancing communication characteristics. The wireless transport layer protocol also provides a guaranteed packet delivery mechanism and recovery algorithm without increasing communications overhead or introducing control packets.

BRIEF DESCRIPTION OF THE DIAGRAMS

An embodiment of the present invention will now be described more fully with reference to the accompanying drawings in which.

DETAILED DESCRIPTION OF THE PREFERRED EMBODIMENT

Presently defined and currently used data network and transport layer protocols that operate OSI layers 3 and 4, can be categorized into two significant classifications, namely connection oriented protocols and connectionless protocols.

Connection oriented protocols are characterized by additional packets dedicated to establish and/or end logical connection channels and virtual circuits between communicating parties. These additional packets are acknowledged by the communicating parties to confirm end-to-end packet delivery.

Connectionless protocols do not contain these additional packets, and as a result, they cannot guarantee delivery of packets to their final destinations. These connectionless protocols are commonly referred to as "best effort" protocols.

Figure 1:
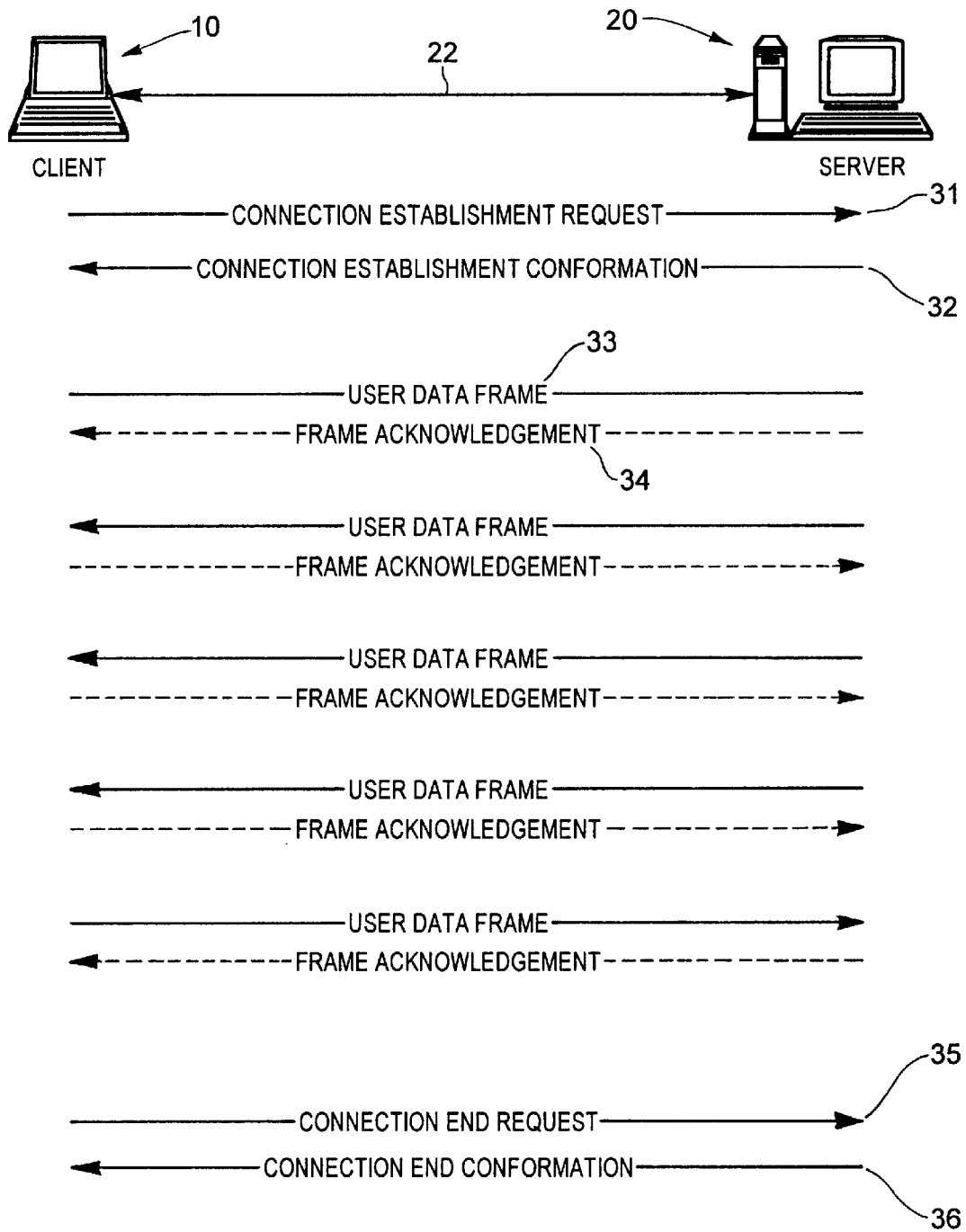
FIG. 1 illustrates data now and packet structure using a connection oriented communication protocol in a conventional prior art "wired" land-line network.

For ease of understanding, communications over a prior art "wired" land-line network will firstly be described. Turning now to FIG. 1, a standard client-server communication channel over a "wired" land-line network is shown implementing a standard connection oriented protocol such as X.25, TCP/IP, etc. During communications between the client 10 and the server 20, if the client wishes to initiate communications, the client 10 sends a connection establishment request packet 31 to request a logical communication channel/virtual communication circuit to the server 20. If the server 20 is capable of communicating and has available communication resources, the server 20 responds with a connection establishment confirmation packet 32. From this moment, a logical communication channel/virtual communication circuit 22 is established between the client and the server 20 and transfer of data packets 33 between the client 10 and the server 20 commences.

If an application using this logical communication channel/virtual communication circuit 22 requires enhanced reliability and has strict data packet delivery time constraints, delivery of each data packet 33 to either the client 10 or the server 20 must be confirmed by the recipient via a frame acknowledgment packet 34. In cases where delivery requirements are not so strict, delivery of every second, third, etc. data packet can be confirmed via a frame acknowledgment packet 34. When either of the communicating parties needs to terminate the communications session, a connection end request packet 35 is sent which must be confirmed by the recipient with a proper connection end confirmation packet 36 in order to terminate the communications session.

As will be appreciated, packet delivery over the "wired" land-line network is guaranteed through use of the connection establishment confirmation and connection end confirmation packets 32 and 36 as well as the frame acknowledgment packets 34.

Conventional connectionless protocols do not use additional packets such as the connection establishment confirmation and connection end confirmation packets or the frame acknowledgment packets nor do they include any means to notify communicating parties that packets have actually reached their destinations. As a result, no recovery mechanisms are provided in these connectionless protocols to verify successful data packet delivery. Based on these characteristics, connectionless protocols can only be used with a limited number of applications, and specifically those applications that do not resolutely rely on reliable communications.

Figure 2:
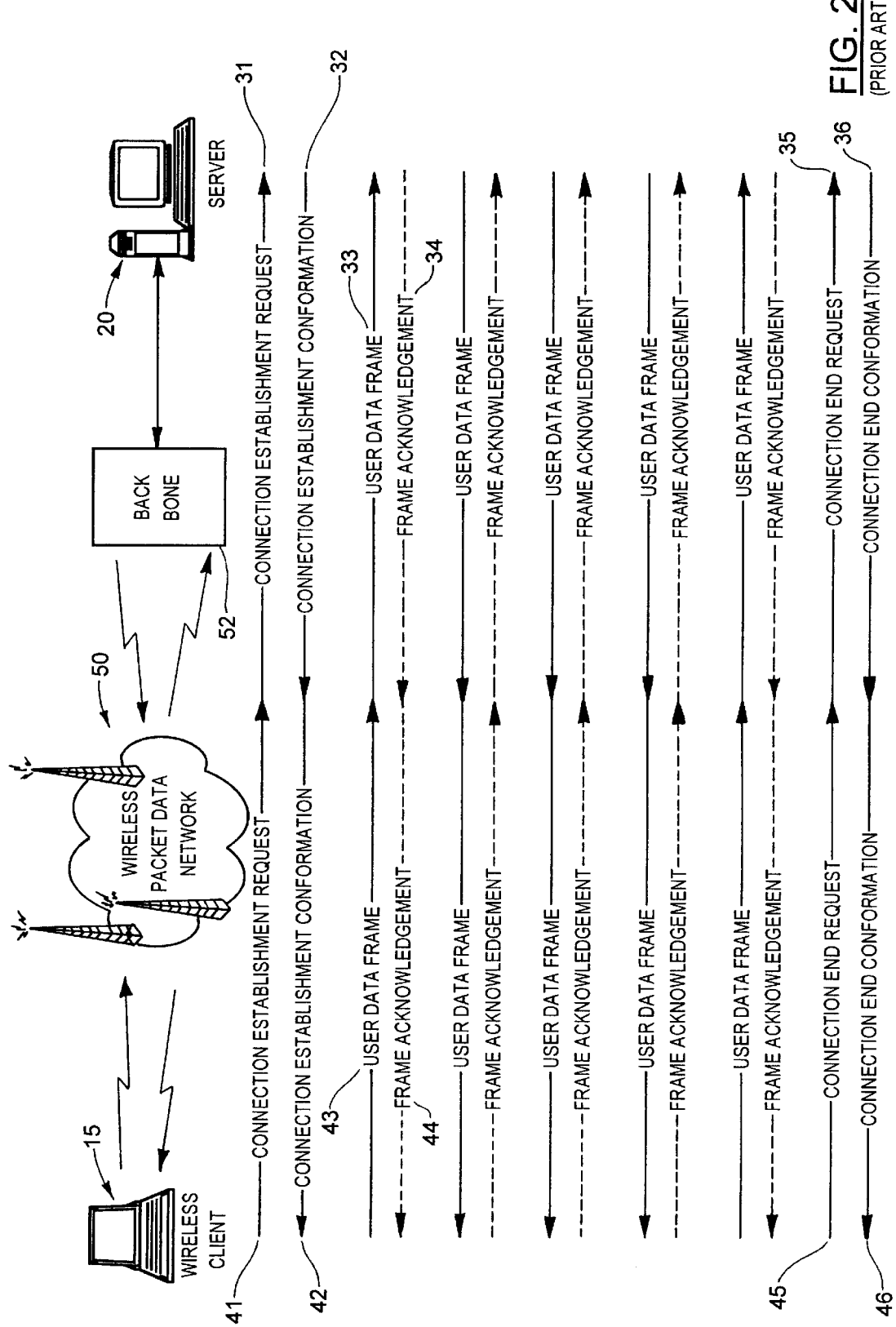
FIG. 2 illustrates data flow and packet structure using a wireless extension of a standard "wired" land-line connection oriented protocol in a wireless network.

Turning now to FIG. 2, an extension of a "wired" land-line connection oriented protocol used in a wireless network is shown. In this case, wireless client 15 behaves in a manner similar to wired client 10. When wireless client 15 wishes to communicate with server 20, wireless client 15 generates a wireless connection establishment request packet 41, which is similar to the connection establishment request packet 31 except that it also includes wireless network overhead. The connection establishment request packet 41 is then transmitted over the wireless network 50 to a network backbone 52. The network backbone 52 acts as a gateway or similar type of network bridge and strips the wireless network overhead from the connection establishment request packet 41 before conveying it to the server 20 as a connection establishment request packet 31.

When the server 20 receives the connection establishment request packet 31, the server 20 responds with a connection establishment confirmation packet 32. The connection establishment confirmation packet 32 is then sent to the network backbone 52. The wireless network overhead is then added to the connection establishment confirmation packet 32 to form a wireless connection confirmation packet 42. The wireless connection confirmation packet 42 is then transmitted wirelessly over the wireless packet data network 50 to the client 15. Frame acknowledgment, connection end and connection end confirmation packets are transmitted between the wireless client 15 and the server 20 in the same manner described above. As should be apparent, the packets received and transmitted by the server 20 are the same as the packets received and transmitted by the wireless client 15 with the exception that the packets received and transmitted by the wireless client 15 carry a wireless extension. As will be appreciated, using the connection oriented protocol over a wireless network requires the need for wireless extensions, which add more overhead to and increase communications over the logical communication channel.

Wireless networks have completely different characteristics than "wired" land-line networks and as such connection oriented protocols are generally unsuitable for wireless networks. In particular, connection oriented protocols congest the already limited throughput and channel bandwidth of wireless networks. The principal differences between "wired" land-line networks and wireless networks are reflected in media access algorithms and mechanisms derived from different physical transport media. Both communications media utilize a type of collision avoidance media access algorithm. However, wireless infrastructures have a more difficult task, and require more time to detect and resolve collisions, even in full duplex environments. Additional packets, control packets, frame acknowledgment packets or any packets that do not carry actual user data, dramatically reduce the throughput of wireless networks because of slower media access procedures. Most wireless packet data networks operate in strictly regulated narrow-band channels. As a result, data transfer rates over wireless networks are significantly lower than over land-line networks. The same applies to wireless networks that operate on wideband channels, such as spread-spectrum CDMA networks. These wireless networks have the same throughput limitation problems but on a much higher level. Thus, protocols designed for land-line networks with considerable overhead, especially TCP/IP, are unsuitable for wireless networks.

To overcome the disadvantages associated with using connection oriented protocols in wireless networks, a wireless transport layer protocol in accordance with the present invention is provided. The wireless transport layer protocol reduces the gap between "wired" land-line networks and wireless networks while maintaining overhead and data packet transmission at acceptable levels. The wireless transport layer protocol also improves wireless-link throughputs within the limited bandwidths regardless of network backbone connections, protocols and characteristics.

Figure 3:
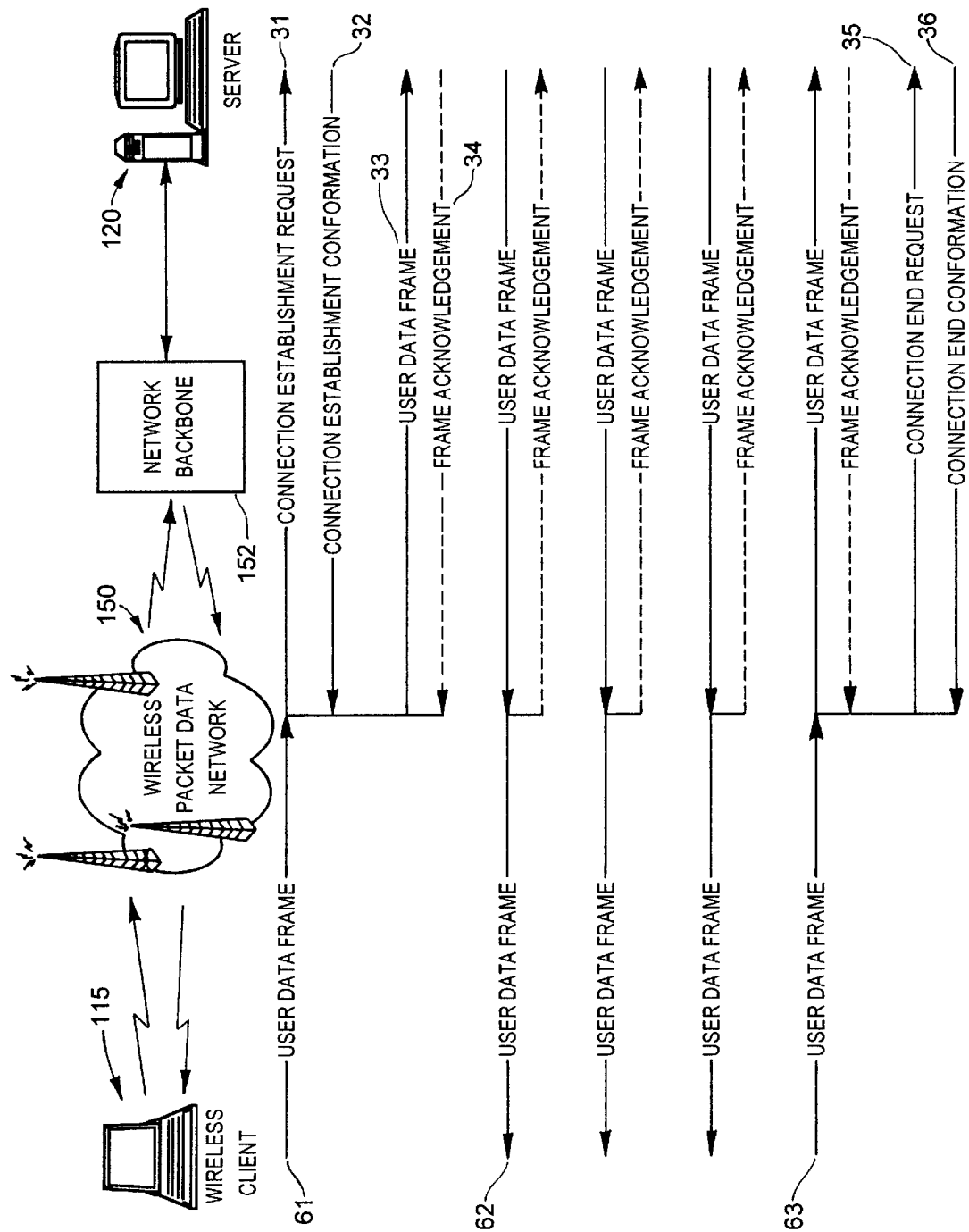
FIG. 3 illustrates data flow and packet structure using a wireless transport layer protocol in accordance with the present invention in a wireless network.

Turning now to FIG. 3, end-to-end data packet flow in a wireless network utilizing the wireless transport layer protocol in accordance with the present invention is shown. Through its architecture, the wireless transport layer protocol is a connectionless protocol, but utilizes specific opening and closing data frames 61 and 63 that are capable of driving connection oriented protocols on the network backbone 152. Protocol overhead is reduced by abandoning the idea of protocol embedding as discussed with reference to FIG. 2. In other words, data frames transmitted over wireless packet data network 150 only carry the wireless overhead and user data and do not carry any land-line protocol overhead.

As can be seen, during communications between wireless client 115 and server 120, data frames 61 to 63 are transmitted and received by wireless client 115 via wireless network 150. Frame acknowledgment, connection establishment request and confirmation packets are not transmitted over the wireless network 150. The network backbone 152 interfacing the wireless network 150 and the server 120 acts as the access gateway and is responsible for combining and assembling data packets dictated by the wireless transport protocol according to the protocol of the network backbone. As a result, acknowledgment, connection establishment request and connection establishment confirmation packets are transmitted between the network backbone 152 and the server 120 but these packets do not carry through to the wireless network 150.

The wireless transport protocol utilizes additional on-line data compression for extra actual throughput and bandwidth gain. Specifically by eliminating transmission of acknowledgment and confirmation packets over the wireless network 150, separate delivery confirmation procedures are introduced into the wireless transport protocol in order to overcome the reliability problems associated with conventional wireless networks implementing a "best effort" protocol. In particular, a specific sequencing algorithm is implemented, which relies on both incoming and outgoing sequence number tracking and processing to confirm packet delivery over the wireless network 150.

Figure 4:
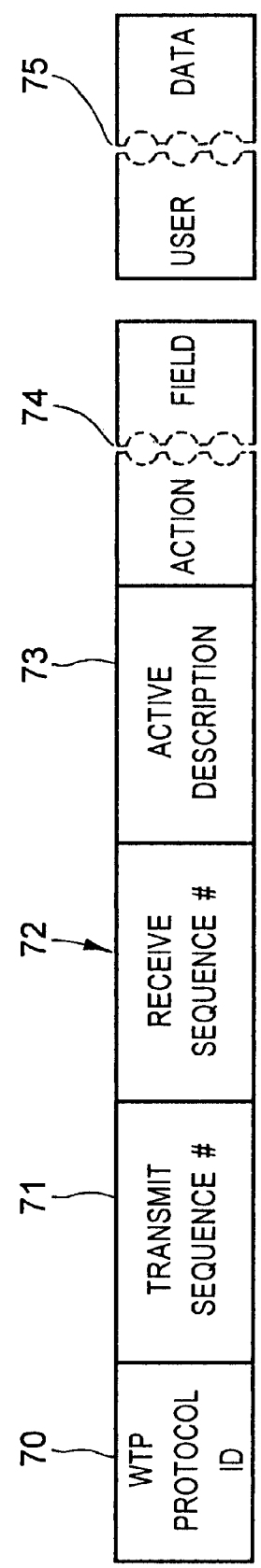
FIG. 4 illustrates the basic elements, structure of information and packet layout of the wireless transport layer protocol in accordance with the present invention.

FIG. 4 illustrates the basic topology of a wireless transport layer protocol frame. As can be seen, the wireless transport layer protocol frame includes a protocol ID 70, a transmit sequence number 71, a receive sequence number 72, an action description field 73, a variable action field 74 and a user data field 75. The protocol ID 70 is a one byte field identifying the actual protocol implementation and provides space for future protocol enhancements and/or adaptations for any standard protocol. Transmit sequence number 71 is a word long field specifying the current message ID. Receive sequence number 72 is a word long field specifying the message ID of the last received message.

Action description field 73 provides information about the length of variable action field 74, as well as additional packet descriptions such as session and connection handling information, connection establishment and request confirmation, session start/close, etc. Variable action field 74 contains the actual information necessary to execute the action described in action description field 73 such as connection addressing, source and destination physical and port addresses, session related information, call request user data, network management information, X.25 Q and D bit status, encryption handling data, etc. User data field 75 contains the actual end-to-end communications data.

During communications, the transmit and receive sequence number fields 71 and 72 respectively play a predominant role in assuring packet delivery. The wireless client 115 and the server 120 are both responsible for keeping track of transmit and receive sequence numbers 71 and 72. Each data message received by the wireless client 115 is treated as a confirmation packet, since the received data message includes the packet ID of the last packet received by the server 120. If the packet ID number does not correspond to the packet ID of the last packet transmitted by the wireless client 115 to the server 120, the wireless client 115 establishes that the previously sent packet was not received by the server 120. The previously sent packet can then be re-transmitted by the wireless client 115. If communicating parties perform this sequence number check, packet delivery over the wireless network 150 can be guaranteed. If this sequence number check is utilized by the protocol of the network backbone 152, packet delivery on the network backbone can also be guaranteed thereby achieving a reliable end-to-end communication channel between the wireless client 115 and the server 120.

As will be appreciated by using transmit and receive sequence numbers in the wireless transport layer protocol, packet delivery over the wireless network can be guaranteed without the overhead of additional confirmation and acknowledgment packets. Thus, by using the wireless transport layer protocol in accordance with the present invention, reliable end-to-end communications channels between wireless clients and land-line servers can be established.

Although a preferred embodiment of the present invention has been described, those of skill in the art will appreciate that variations and modifications may be made without departing from the spirit and scope thereof as defined by the appended claims.

I claim:

1. A wireless transport layer protocol for data frames transmitted over communication networks wherein a wireless party communicates with a wired party over a wireless network and a land-line network, said wireless transport layer protocol establishing the format of said data frames, each data frame comprising:
    connection handling information specifying at least one data transport connection to be used to transmit data between said wireless party and said wired party over said wireless network and land-line network;
    connection addressing information;
    a user data field including a data packet to be transmitted by a sending party to a receiving party; and
    at least one sequencing field including information identifying the last data packet received by the sending party that was transmitted by the receiving party.

2. A wireless transport layer protocol according to claim 1 wherein said information identifies the identification (ID) number of the last data packet received by the party transmitting a current data packet.

3. A wireless transport layer protocol according to claim 2 including transmit and receive sequencing fields, said transmit sequencing field specifying a current data packet ID and said receive sequencing field specifying the ID of the last data packet received by the party transmitting the current packet.

4. A wireless transport layer protocol according to claim 3 further including action and action description fields, said action description field providing length information concerning said action field and additional packet description information, said action field including information necessary to execute actions described in said action description fields.

5. A wireless transport layer protocol according to claim 4 wherein said action description field includes said connection handling information and wherein said action field includes said connection addressing information.

6. A communication system comprising:
a wireless client;
a wireless network;
a land-line client;
a land-line network; and
a network backbone interfacing said land-line network and said wireless network to allow data packets to be exchanged between said wireless client and said land-line client, said communication system using a wireless transport layer protocol for data frame transmission over said land-line and wireless networks, each data frame including connection handling information specifying at least one data transport connection to be used to transmit data between said wireless client and said land-line client over said wireless and land-line networks; connection addressing information; a user data field including a data packet to be transmitted from one client to another client; and at least one sequencing field identifying the last packet received by the client that is transmitting a current data packet.

7. A communication system according to claim 6 wherein each data frame includes transmit and receive sequencing fields, said transmit sequencing field specifying a current data packet ID and said receive sequencing field specifying the ID of the last data packet received by the client transmitting the current packet.

8. A communication system according to claim 7 wherein each data packet further includes action and action description fields, said action description field providing length information concerning said action field and additional packet description information, said action field including the information necessary to execute actions described in said action description fields.

9. A communications system according to claim 8 wherein said action description field includes said connection handling information and wherein said action field includes said connection addressing information.

10. A communication system according to claim 7 wherein said wireless client executes a sequencing algorithm to process the data packet IDs in said transmit and receive sequencing fields thereby to confirm packet delivery over said wireless network.

11. A communication system according to claim 10 wherein said land-line client also executes a sequencing algorithm to confirm packet delivery over said land-line network.

12. An end-to-end transport layer protocol to run over a communication system including a wireless network, a land-line network and a network backbone interfacing said wireless network and said land-line network, said transport layer protocol establishing the format for data frames communicated between a wireless client and a wired client over said communication system, each data frame comprising connection handling information specifying at least one data transport connection to be used to transmit data between said wireless client and said land-line client over said wireless and land-line networks; connection addressing information; a user data field including a data packet to be transmitted from one client to another client; and at least one sequencing field identifying the last packet received by the client that is transmitting a current data packet, said wireless client executing a sequencing algorithm to process the data in said at least one sequencing field to confirm packet delivery over said wireless network.

13. A communication system according to claim 12 wherein each data frame includes transmit and receive sequencing fields, said transmit sequencing field specifying a current data packet ID and said receive sequencing field specifying the ID of the last data packet received by the client transmitting the current packet.

14. A communication system according to claim 13 wherein each data packet further includes action and action description fields, said action description field providing length information concerning said action field and additional packet description information, said action field including the information necessary to execute actions described in said action description fields.

15. A communication system according to claim 14 wherein said action description field includes said connection handling information and wherein said action field includes said connection addressing information.

16. A communication system according to claim 12 wherein said land-line client also executes a sequencing algorithm to confirm packet delivery over said land-line network.

17. A communication system comprising:
a wireless network having at least one wireless client thereon;
a land-line network having at least one wired client thereon;
a network backbone interfacing said wireless network and said land-line network; and
an end-to-end transport layer protocol running over said wireless network and said land-line network, said transport layer protocol establishing data frame format during transmission of data frames between a wireless client and a wired client, wherein connection establishment confirmation, connection end confirmation and data frame acknowledgment packets are only conveyed over said land-line network between said network backbone and said wired client and wherein said data frame format enables packet delivering confirmation over said wireless network in the absence of said connection establishment confirmation, connection end confirmation and data frame acknowledgement packets.

18. A communication system according to claim 17 wherein said wireless client executes a sequencing algorithm that processes data packet identifying data in said data frames to confirm packet delivery.

19. A communication system according to claim 18 wherein said data packet identifying data includes a current data packet ID and the ID of the last data packet received by the client transmitting the current data packet.

20. A communication system according to claim 19 wherein said wired client also executes a sequencing algorithm.

* * * * *